(12) United States Patent  (10) Patent No.: US 7,380,973 B2
Goedicke et al.  (45) Date of Patent: Jun. 3, 2008

(54) METHOD AND DEVICE FOR THE REPROCESSING OF A THERMOPLASTIC POLYCONDENSATE

(75) Inventors: Frank Goedicke, Niederhelfenschwil (CH); Federico Innerebner, Zürich (CH)

(73) Assignee: Buehler AG, Uzwill (CH)

( * ) Notice: Subject to any disclaimer, the term of this patent is extended or adjusted under 35 U.S.C. 154(b) by 327 days.

(21) Appl. No.: 10/697,661

(22) Filed: Oct. 30, 2003

(65) Prior Publication Data

US 2004/0072920 A1  Apr. 15, 2004

Related U.S. Application Data

(62) Division of application No. 09/856,833, filed as application No. PCT/CH99/00515 on Nov. 3, 1999, now Pat. No. 6,838,496.

(30) Foreign Application Priority Data

Nov. 26, 1998 (DE) ................. 198 54 689

(51) Int. Cl.
  *B29B 7/24* (2006.01)
(52) U.S. Cl. .......... 366/75; 366/76.4; 366/85; 366/88
(58) Field of Classification Search ........ 366/83, 366/84, 85, 75, 76.3
  See application file for complete search history.

(56) References Cited

U.S. PATENT DOCUMENTS

| 1,356,296 | A | * | 10/1920 | La Casse | 366/76.4 |
| 2,563,396 | A | * | 8/1951 | Colombo | 425/204 |
| 2,942,294 | A | * | 6/1960 | Reifenhauser | 425/204 |
| 3,392,962 | A | * | 7/1968 | Fritsch et al. | 366/83 |
| 3,985,348 | A | * | 10/1976 | Skidmore | 366/75 |
| 4,107,787 | A | * | 8/1978 | Ocker | 366/75 |
| 4,260,264 | A | * | 4/1981 | Maki et al. | 366/75 |
| 4,591,487 | A | * | 5/1986 | Fritsch | 422/134 |
| 4,763,569 | A | * | 8/1988 | Wenger et al. | 99/348 |
| 5,283,021 | A | * | 2/1994 | Shih | 264/102 |
| 5,476,319 | A | * | 12/1995 | Blach | 366/83 |
| 5,836,682 | A | * | 11/1998 | Blach | 366/84 |
| 5,941,634 | A | * | 8/1999 | Tynan et al. | 366/79 |
| 6,074,084 | A | * | 6/2000 | Kolossow | 366/84 |
| 6,190,031 | B1 | * | 2/2001 | Blach et al. | 366/75 |
| 6,196,711 | B1 | * | 3/2001 | Blach et al. | 366/83 |
| 7,025,491 | B2 | * | 4/2006 | Blach et al. | 366/85 |
| 7,040,798 | B2 | * | 5/2006 | Innerebner et al. | 366/76.3 |

* cited by examiner

*Primary Examiner*—Tony G Soohoo
(74) *Attorney, Agent, or Firm*—Reed Smith LLP

(57) ABSTRACT

Method and device for reprocessing a thermoplastic polycondensate, in particular for the recycling of thermoplastic polycondensates, such as polyethylene terephthalate, polyester or polyamide is provided. The polycondensate is introduced into an extruder in a solid state. The polycondensate is then heated to a temperature below melting temperature and degassed or dried at below atmospheric pressure or with an inert gas added. Preferably, to prevent the polycondensate flakes from escaping through a degassing opening, a conveying device is used to convey the escaping flakes back into the extruder. The dried flakes are then melted.

7 Claims, 4 Drawing Sheets

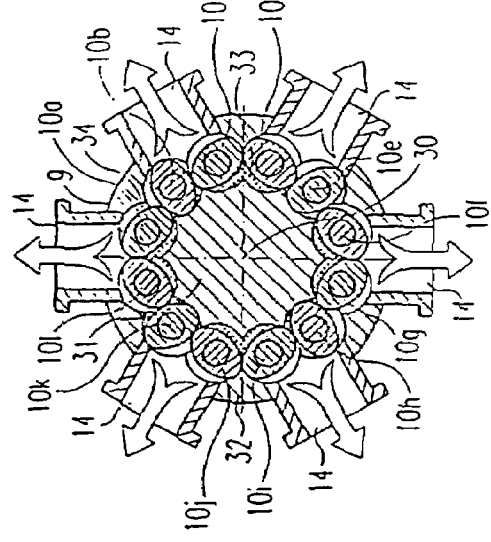
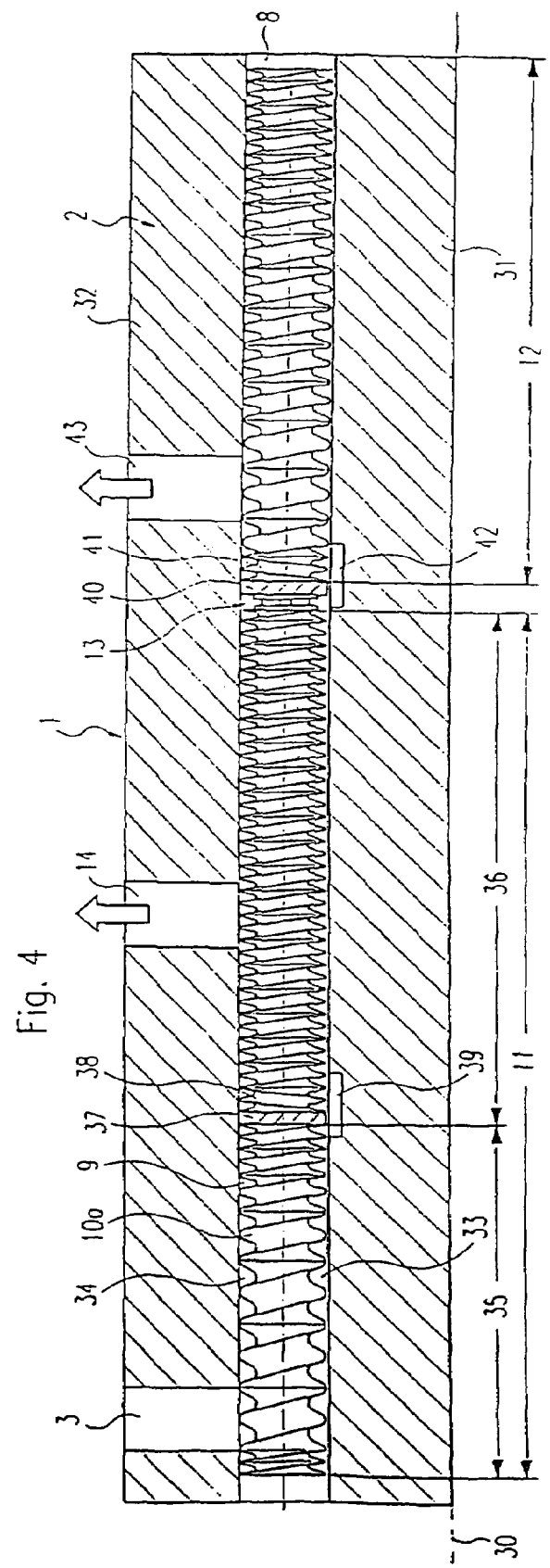

METHOD AND DEVICE FOR THE REPROCESSING OF A THERMOPLASTIC POLYCONDENSATE

CROSS REFERENCE TO RELATED APPLICATIONS

This is a divisional application of U.S. patent application Ser. No. 09/856,833 filed Oct. 9, 2001, which claims priority of PCT/CH99/00515 filed Nov. 3, 1999, which claims priority to DE 198 54 689.0 filed Nov. 26, 1998, all of which are incorporated herein by reference.

The invention relates to a method and a device in the form of an extruder for the reprocessing of a thermoplastic polycondensate. The method according to the invention and the extruder according to the invention serve in particular for the recycling of thermoplastic polycondensates, such as polyethylene terephthalate, polyester or polyamide.

DE 42 08 099 A1 discloses a method and an extruder of the prior art. In the case of the method for the reprocessing of a thermoplastic polycondensate known from this document, the size-reduced polycondensate is fed to an extruder in a still solid, non-molten state. The extruder is a twin-screw extruder with two screws running parallel in a barrel and closely intermeshing. The still solid polycondensate is heated in a first reprocessing zone to a temperature below the melting point, so that low-molecular-weight constituents, in particular water, can at least partially escape via a degassing opening provided in the barrel. Then, the polycondensate is worked and made to melt by means of kneading elements. In a following processing zone, the polycondensate melt is subjected to a reduced pressure, so that more of the low-molecular-weight constituents, in particular water, still remaining in the melt can escape via a discharge opening. The polycondensate melt is then fed to a mixing vessel, in which the melt is agitated by mixing implements. At the surface constantly being renewed by the mixing operation, the low-molecular-weight constituents can outgas further and escape from the mixing vessel vie a degassing opening.

In the case of this known method, it is disadvantageous that the degassing and drying of the polycondensate in the still solid state is incomplete, since the low-molecular-weight constituents released during the heating escape only incompletely via the degassing opening, especially since the degassing opening cannot be dimensioned to any desired size. In the processing zone, in which the polycondensate to be reprocessed is heated for the degassing and drying to a temperature below the melting point, a thermodynamic equilibrium is therefore established between the vapor phase of the low-molecular-weight constituents and the low-molecular-weight constituents bonded in the polycondensate. The effectiveness of the degassing and drying is restricted on account of the limited escape of the vapor phase from the degassing opening.

DE 42 31 231 C1 discloses in principle a multi-screw extruder with a plurality of screw shanks arranged in an annular form between an inner barrel and an outer barrel for the degassing of a polycondensate melt. In the case of the method disclosed by this document, however, the polycondensate is fed to the extruder in the already molten state and degassing does not take place in the still solid state. The effectiveness of this method is therefore likewise limited. Moreover, the melting of the polycondensate takes place in a device which is separate from the multi-screw extruder, which leads to increased expenditure. This method is therefore only conditionally suitable for the recycling of thermoplastic polycondensates.

The present invention is based on the object of providing a method and an extruder for the reprocessing of a thermoplastic polycondensate in which the degassing and/or drying of the polycondensate in the still solid state is improved.

The invention is based on the finding that the effectiveness of the degassing and/or drying of the polycondensate in the still solid state can be improved by the polycondensate being subjected to a reduced pressure, below atmospheric pressure, and/or by adding an inert gas. The reduction in pressure has the effect that the vapor pressure of the low-molecular-weight constituents is reduced, so that these constituents evaporate more easily from the still solid polycondensate. The adding of an inert gas has the effect in the thermodynamic equilibrium of reducing the partial pressure of the undesired low-molecular-weight constituents, in particular of the water constituents bonded in the still solid polycondensate. On account of the reduced partial pressure, these undesired low-molecular-weight constituents can likewise evaporate more easily from the polycondensate. In this connection, the term inert gas is to be understood as meaning that this gas is not enriched, or only to a slight extent, in the polycondensate and does not change the properties of the polycondensate in an undesired way. The measures of the reduced pressure and the addition of the inert gas can also be combined with one another in such a way as to increase effectiveness.

The invention is also based on the finding that an extruder suitable for carrying out the aforementioned method has to be modified in comparison with a known extruder in such a way that the still solid polycondensate cannot escape via the degassing opening. The polycondensate is fed to the extruder in the solid state, generally in the form of flakes or granules, which are obtained for example from the recycled products, for example disposable plastic bottles, by shredding or other size-reducing methods. These polycondensate flakes or the granules are relatively lightweight and can escape at the degassing opening, at which a reduced pressure has to be applied or via which the inert gas flows for the method according to the invention, on account of the pressure gradient prevailing there. A screen or filter arranged at the degassing opening would wear away in a short time and is therefore not suitable. The invention therefore proposes, providing a conveying device at the degassing opening of a twin-screw or multi-screw extruder, which device conveys the polycondensate which has escaped via the degassing opening back into the extruder. This device can clean itself on the screw shanks of the extruder. Alternatively, it is proposed to use a multi-screw extruder in which an inner space is formed between an inner barrel and the screw shanks arranged in an annular form and an outer space, which is separate from the inner space, is formed between an outer barrel and the screw shanks. The still solid polycondensate may then either be located in the inner space and the degassing opening may be connected to the outer space, or the still solid polycondensate may conversely be located in the outer space and the degassing opening may be connected to the inner space. The screw shanks, closely intermeshing with one another, in any event prevent the solid polycondensate flakes from pushing forward to the degassing opening. Escape of the polycondensate flakes via the degassing opening is therefore prevented.

The method according to the invention is suitable in particular, but in no way exclusively, for the recycling of polyester, in particular polyethylene terephthalate and polyamide. The polycondensate is introduced into the extruder preferably in the form of flakes, the thickness of which is on average less than 2 mm and the greatest extent of which is on average less than 20 mm. It is advantageous to subject the polycondensate to a pressure below atmospheric pressure and/or to the inert gas already before it is introduced into the extruder, in order to increase further the effectiveness of the method. The polycondensate may also be heated to a temperature below the melting temperature of the polycondensate already before it is introduced into the extruder.

After the melting of the polycondensate, a further degassing of the polycondensate melt may take place. In this process, an inert gas, preferably in condensed form, may be added to the polycondensate melt at an increased pressure. By causing foaming, this leads to an increase in the surface area of the phase boundary. Here, too, the inert gas reduces the partial pressure of the undesired low-molecular-weight constituents in the polycondensate melt and makes it easier for them to outgas. Nitrogen, carbon dioxide or dried air are suitable in particular as the inert gas. It is advantageous if the polycondensate melt is passed through at least one melt filter. Melt filters may be connected to the conveying zone of the extruder, following the kneading elements or downstream of the extruder. The use of melt filters leads to the polymer melts from the further processing having a constant and high product quality. Melt particles with a size of 20-50 μm which have not been expelled in the region of the first conveying zone, in which the polycondensate is still in the solid state, can be separated from the melt stream during the filtration. For plastics processing (polycondensates such as PA, PET etc.), the wire gauze filter is used, with smallest filter grades of between 5 and 100 μm.

The conveying devices may be designed as conveying screws, in particular as in each case two closely intermeshing conveying screws. It is advantageous if the conveying devices or the surrounding barrel are heatable. This prevents condensation of the degassing low-molecular-weight constituents at the conveying device and conveying back of them into the extruder. If appropriate, the degassing opening may also coincide with the inlet opening for feeding the polycondensate into the extruder and the conveying device provided there may at the same time serve for the metered feeding of the polycondensate into the extruder.

It is also advantageous if the barrel is heatable in the region of the first conveying zone, in which the polycondensate is still in the solid state, in order to ensure rapid and uniform heating of the polycondensate.

The invention is described in more detail below on the basis of exemplary embodiments with reference to the drawing, in which:

FIG. 3 shows a cross section through a third exemplary embodiment of an extruder according to the invention;

FIG. 4 shows a sectioned longitudinal half-representation of an extruder corresponding to the exemplary embodiment represented in FIG. 3.

Figure 1:
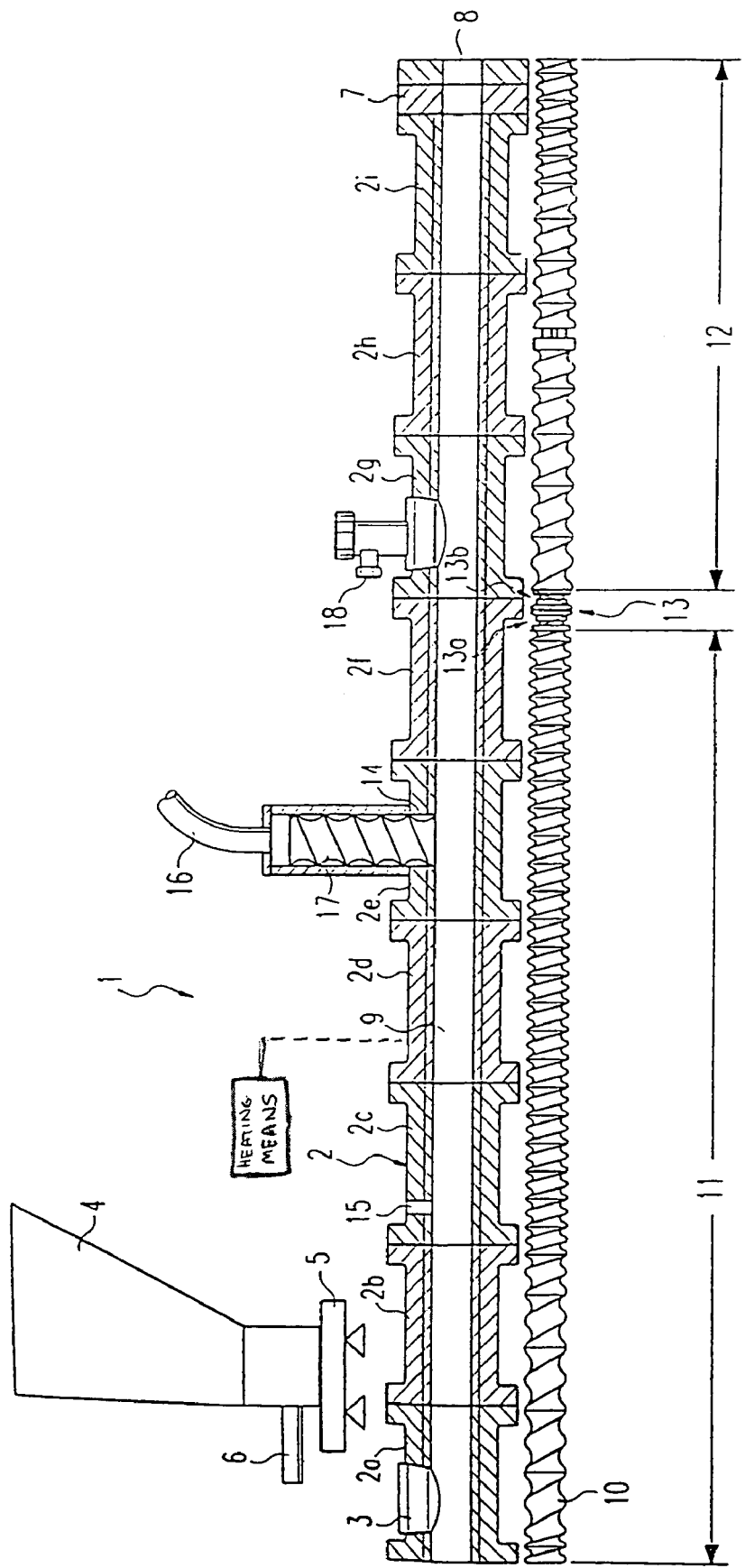
FIG. 1 shows a first exemplary embodiment of an extruder according to the invention in a longitudinal representation.

FIG. 1 shows a first exemplary embodiment of an extruder 1 according to the invention. The extruder 1 represented in FIG. 1 is designed as a twin-screw extruder. The extruder 1 comprises a barrel 2, which is constructed in a modular manner from a plurality of part-barrels 2a-2i. The part-barrels 2a-2i are flanged to one another. The first part-barrel 2a has an inlet opening 3, via which the polycondensate to be reprocessed is fed to the extruder 1 in a still solid state, preferably in the form of flakes. The polycondensate is located in a silo 4 and is metered in via a metering system 5 and a conveying device 6. At the end of the last part-barrel 2i is the output flange 7, with an outlet opening 8, at which the reprocessed polycondensate melt emerges.

Two longitudinal bores, which are arranged offset with respect to one another and only one of which, bore 9, can be seen in FIG. 1, are provided in the barrel 2. Inserted in each of the two longitudinal bores there is in each case a screw shank 10, which in FIG. 1 is drawn outside the associated longitudinal bore 1 for reasons of improved representation. The screw shanks 10 extend from the inlet opening 3 to the outlet opening 8. The two screw shanks 10 intermesh closely with one another and are driven in the same direction of rotation.

The screw shanks 10 are divided roughly into a first conveying zone 11, for conveying the polycondensate in the solid state, and a second conveying zone 12, for conveying the polycondensate in the molten state. Between the first conveying zone 11 and the second conveying zone 12 there are kneading elements 13. While the conveying screw 10 initially has a relatively great pitch in its first conveying zone 11, in the region of the inlet opening 3, the pitch is reduced in the direction of the outlet opening 8, as a result of which the polycondensate is drawn in relatively quickly at the inlet opening 3. The dwell time or dwell time spectrum of the polycondensate in the first conveying zone 11 is relatively long, so that the polycondensate can heat up to a temperature below the melting point. For this purpose, the barrel 2 is heated in the region of the first conveying zone 11 by heating elements (not represented). As a result, low-molecular-weight constituents of the polycondensate, in particular water, can outgas from the polycondensate in the still solid state and escape via a degassing opening 14. To improve the effectiveness of the outgassing of the low-molecular-weight constituents, the first conveying zone 11 of the extruder 1 is subjected to a reduced pressure in comparison with atmospheric pressure or it is flushed with an inert gas. By reducing the pressure in the barrel 2, the vapor pressure of the undesired low-molecular-weight constituents is reduced, so that these low-molecular-weight constituents outgas more easily. The adding of the inert gas brings about a reduction in the partial pressure of these low-molecular-weight constituents, so that the effectiveness of the outgassing is likewise improved. If an inert gas is used, it can be added via an inert-gas inlet opening 15. Nitrogen, carbon dioxide or dried air are suitable in particular as the inert gas. In principle, noble gases are also suitable. The inert gas escaping via the degassing opening 14 can be filtered and fed again to the extruder 1 in a cleaned state via the inert-gas inlet opening 15 in a closed cycle.

A line 16, which is connected to the degassing opening 14, serves for generating a negative pressure in the longitudinal bores 9 or for carrying away the inert gas. According to the invention, a conveying device 17, designed as a conveying screw, is provided at the degassing opening 14 in order to convey polycondensate flakes escaping via the degassing opening 14, due to the negative pressure or the inert gas flowing away, back into the extruder 1 and consequently prevent polycondensate flakes from being able to escape from the extruder 1. The conveying device 17 may also be made up of two closely intermeshing conveying screws arranged next to one another. It is advantageous if the conveying device 17 is heatable. This avoids condensation of the degassing low-molecular-weight constituents, in particular the water vapor, at the conveying device 17 and consequently conveying back of these condensed constituents into the extruder 1.

The kneading elements 13 adjoining the first conveying zone 11 have both distributive and dispersive properties and lead to melting of the polycondensate in a heating region which is kept very short. The melting takes place in a process length of preferably 1 L/D to 2 L/D. The kneading elements are preferably made up of conveying kneading elements 13a and conveying-back kneading elements 13b, in order to increase the dwell time spectrum of the polycondensates at the kneading elements 13 and consequently keep the melting region short. The polycondensates are heated up as close as possible to the melting temperature already in the first conveying zone 11, by the barrel 2 being heated, so that the melting enthalpy to be transferred from the kneading elements 13 to the polycondensates is low.

In the second conveying zone 12, adjoining the kneading elements, the polycondensate melt is conveyed in the direction of the outlet opening 8. Here, too, the pitch of the screw shanks 10 is reduced in the direction of the outlet opening 8. A further degassing of the polycondensate melt preferably takes place in this region. Here, too, the degassing may take place as a result of a reduction in the operating pressure or else additionally as a result of the adding of an inert gas, in particular nitrogen. The adding of the inert gas preferably takes place in a condensed state, the polycondensate melt being subjected to an increased pressure when the gas is added. During a subsequent reduction in pressure of the polycondensate melt, the inert gas and the undesired low-molecular-weight constituents outgas from the polycondensate melt and can leave via a further degassing opening 18.

It is advantageous to expose the polycondensate in the silo 4 already to an inert gas atmosphere and/or a reduced pressure and subject it to, an increased temperature, in order to increase the effectiveness of the method and reduce the heating-up time in the first conveying zone 11.

The kneading elements are preferably located at the end of a part-barrel 2f. This has the advantage that the melt zone lies at the end of the part-barrel 2f, so that the further processing in the adjoining part-barrel 2g can be configured in an optimum way.

The method according to the invention is also suitable for a reactive extrusion based on the reaction principle of polyaddition with the aid of additives and/or polycondensation. In this case, the additives are optimally mixed by the kneading elements 13 at the same time as the melting. A possibly necessary increase in the dwell time spectrum is preferably realized by toothed elements. The incorporation of additional substances, in particular glass or pigments, is also possible. These substances are preferably metered in shortly after the melting and are incorporated by means of narrow kneading elements directly after the melting.

In a way corresponding to the invention, suitable as additional substances (additives, color pigments, fillers, processing aids, stabilizers, reactive substances etc.), which are introduced into the extruder along with the polycondensate [sic]. The use of additional substances ensures that a constant melt viscosity of the polycondensate melt is achieved.

Figure 2:
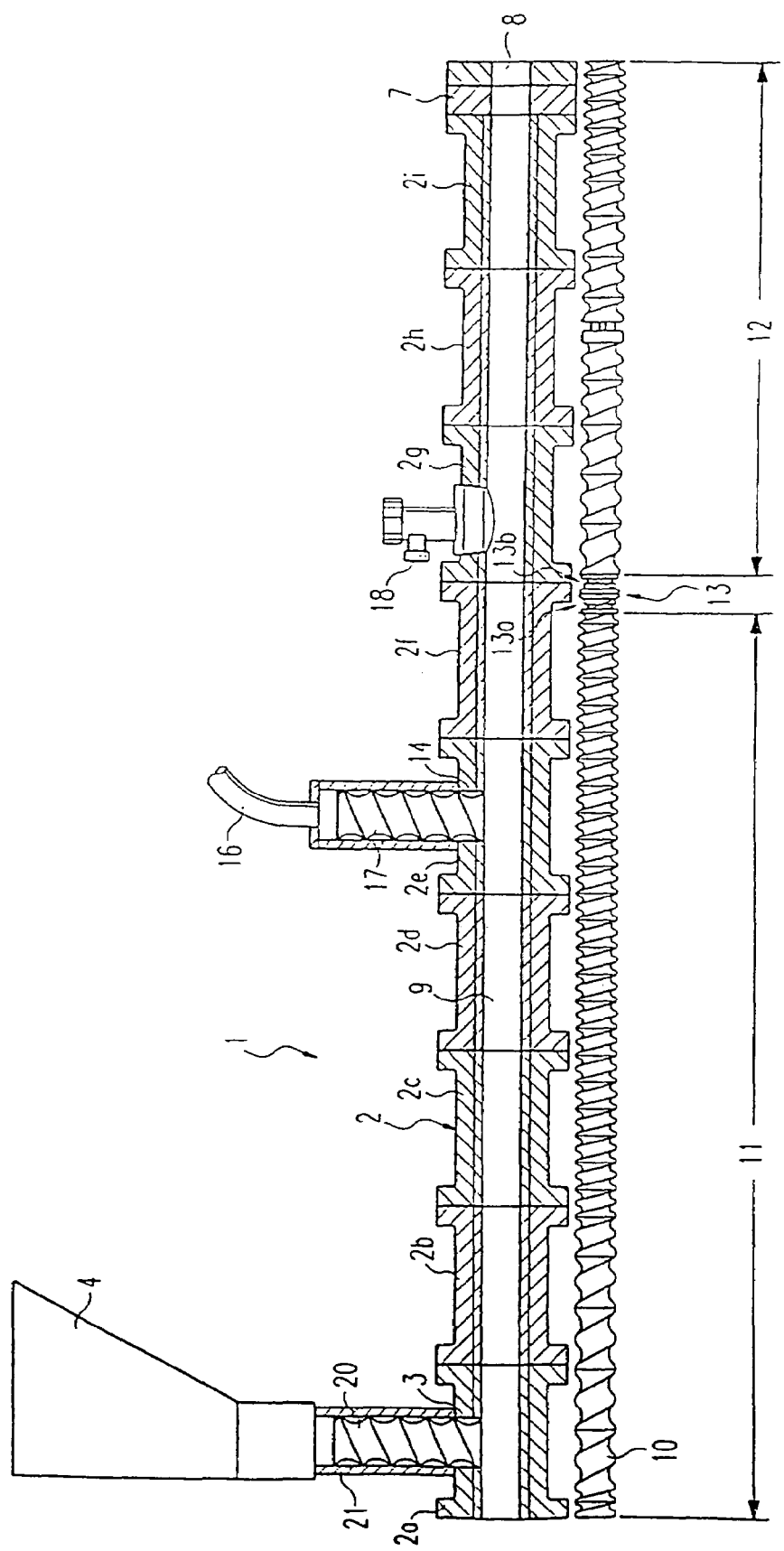
FIG. 2 shows a second exemplary embodiment of an extruder according to the invention in a longitudinal representation.

FIG. 2 shows an exemplary embodiment of an extruder 1 according to the invention modified with respect to FIG. 1. Elements already described on the basis of FIG. 1 are provided with the same reference numerals, so that to this extent there is no need for the description to be repeated.

The difference between the exemplary embodiment represented in FIG. 2 and the exemplary embodiment already described on the basis of FIG. 1 is that the polycondensate is fed in the solid state to the inlet opening 3 of the extruder 1 from the silo 4 via a conveying device 20 designed as a conveying screw or as two closely intermeshing conveying screws. The inert gas can be fed in at the same time via the stub 21, the polycondensate stored in the silo 4 already being kept under an inert-gas atmosphere before the feeding into the extruder.

It is conversely also possible to carry the inert gas away via the stub 21 and the silo 4, the conveying device 20 then conveying counter to the direction of flow of the inert gas. The conveying device 17 and the degassing opening 14 can then also be omitted. The same applies if flushing with an inert gas is not carried out, but instead the extruder 1 is kept at a negative pressure in the first conveying region 11. The vacuum connection necessary for this may be provided directly at the silo 4, the polycondensate being charged into the silo 4 via a suitable air lock. Here, too, the inlet opening 3 may serve at the same time as a degassing opening and the conveying device 17 can be omitted. If the inert-gas inlet opening 15 is arranged in the vicinity of the kneading elements 13, this has the advantage that the direction of flow in the extruder 1 runs counter to the conveying direction and therefore the flushing is particularly effective.

FIGS. 3 and 4 show a completely differently configured extruder 1, which is likewise suitable for carrying out the method according to the invention. In this case, FIG. 3 shows a cross section through the extruder 1 and FIG. 4 shows a longitudinal half-section up to the center axis 30. Elements already described are denoted by the same reference numerals.

In contrast to the twin-screw extruders represented in FIGS. 1 and 2, the extruder 1 represented in FIGS. 3 and 4 is a multi-screw extruder, in which a plurality of screw shanks, twelve in the exemplary embodiment, 10a-10l are arranged in an annular form between an inner barrel 31 and an outer barrel 32. The screw shanks 10a-10l are also designed in a closely intermeshing manner in the case of the multi-screw extruder represented in FIGS. 3 and 4, so that the screw shanks 10a-10l arranged in an annular form separate an inner space 33, formed between the inner barrel 31 and the screw shanks 10a-10l, from an outer space 34, formed between the outer barrel 32 and the screw shanks 10a-10l. In a subregion of the first conveying zone 11 of the extruder 1, which is still to be described in more detail and in which the polycondensate is conveyed in the solid state, the polycondensate is located in the inner space 33, which is indicated in the drawing by cross hatching. The outer space 34, on the other hand, is connected in the exemplary embodiment to a plurality of degassing openings 14, via which evaporating low-molecular-weight constituents of the polycondensate to be reprocessed can escape.

In the first conveying zone 11, in which the polycondensate is in the solid state, the barrel 2, in particular the inner barrel 31, is heated, in order to heat up the polycondensate as far as possible to just below the melting point, and in this way bring about effective outgassing of the low-molecular-weight constituents. In addition, in a way corresponding to the method according to the invention already described, either a negative pressure is generated in the extruder 1 and/or an inert gas, in particular nitrogen, is added for flushing purposes via the outgassing openings 14. The inert gas may in this case enter the inner space 33, in which the polycondensate is located, via inert-gas inlet openings (not represented), pass through between the closely intermeshing screw shanks 10a-10l and escape via the degassing openings 14, which is illustrated by corresponding arrows.

What is important is that, in this configuration, conveying elements are not necessary at the degassing openings 14, because the polycondensate is already prevented from leaving from the degassing openings 14 by means of the closely intermeshing screw shanks 10a-10l.

Nevertheless, if need be, a conveying direction [sic] 17 may be provided at or in the input opening 14 [sic].

The configuration of the screw shanks 10a-10l can be better seen from the longitudinal half-section represented in FIG. 4. A screw shank 10a is represented in the associated longitudinal bore 9, which is formed between the inner barrel 31 and the outer barrel 32. In this case, the inner space 33, formed between the screw shank 10a and the inner barrel 31, and the outer space 34, formed between the screw shank 10a and the outer barrel 32, can likewise be seen. The polycondensate to be processed is fed to the extruder 1 via one or more inlet openings 3 in the solid state, for example in the form of flakes. The screw shanks 10a-10l are divided roughly into a first conveying zone 11, in which the polycondensate is conveyed in the solid state, and a second conveying zone 12, in which the polycondensate melt is conveyed. Between the first conveying zone 11 and the second conveying zone 12 there are kneading elements 13 for the melting of the polycondensate.

The first conveying zone 11 is subdivided into a drawing-in zone 35 and a degassing zone 36. In the drawing-in zone 35, the polycondensate is drawn in, the polycondensate being distributed essentially uniformly in the inner space 33 and the outer space 34. At the end of the drawing-in zone 35 there is a first barrier comprising a conveying-back portion 38, arranged after a spacer ring 37. Provided on the inner barrel 31, but not on the outer barrel 32, is a groove 39, which reaches over the conveying-back region 38. The polycondensate can therefore pass over from the drawing-in zone 35 into the degassing zone 36 only in the region of the inner space 33, so that it is ensured that the polycondensate in the degassing zone 36 is located virtually exclusively in the inner space 33. The barrel 2 is heated in the region of the first zone 11, so that the polycondensate is heated up to just below the melting temperature. At the same time, a negative pressure is generated and/or flushing with an inert gas is carried out. In this way, effective degassing is achieved. At the end of the degassing zone 36 there are kneading elements 13, which have distributive and dispersive properties. The polycondensate is melted very quickly in this region and is subsequently in the form of a melt.

A second barrier, comprising a conveying-back portion 41 arranged after a spacer ring 40, in conjunction with a groove 42 provided on the inner barrel 31, has the effect of ensuring that the polycondensate melt is located with preference in the inner space 33. A second degassing opening 43, which permits additional degassing of the polycondensate melt, opens out in the outer space 34. The melt is distributed relatively uniformly on the surface of the screw shanks 10a-10l, the closely intermeshing screw shanks 10a-10l causing a steady new stretching-out of the melts, whereby constantly new surfaces are produced. As a result, the degassing operation is significantly speeded up. The degassing operation can be promoted by applying a negative pressure to the degassing opening 43, in order to reduce the vapor pressure of the low-molecular-weight constituents, in particular the water content.

Figure 5:
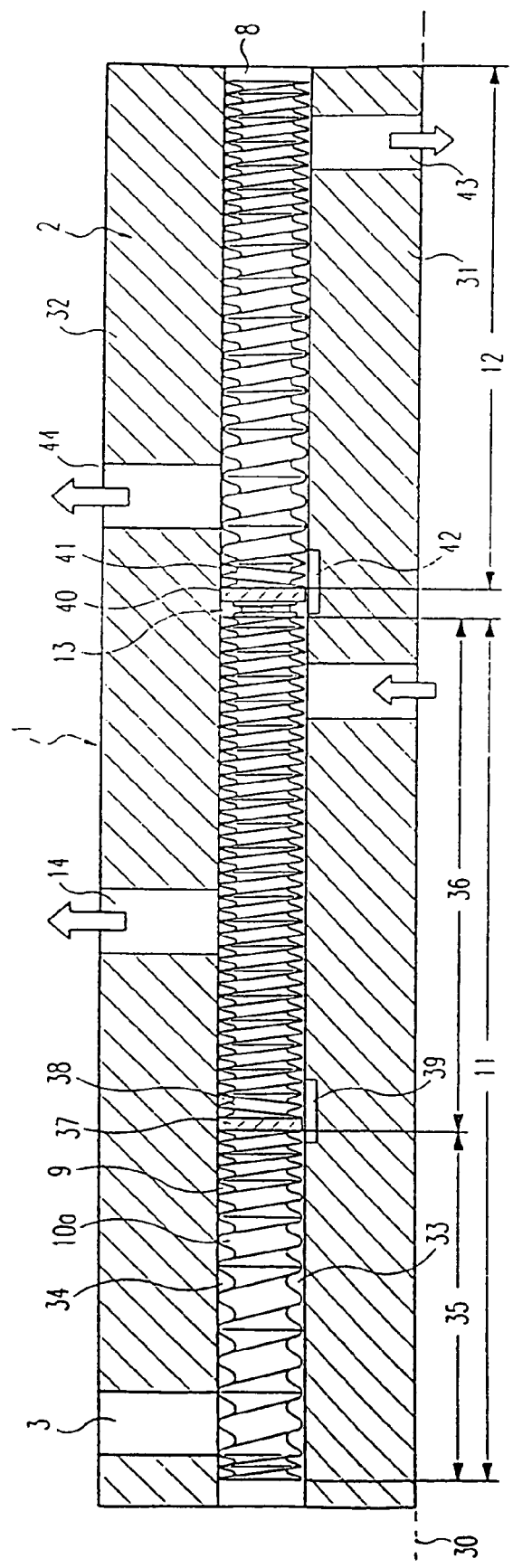
FIG. 5 shows a sectioned longitudinal half-representation of an extruder corresponding to an exemplary embodiment modified with respect to FIG. 4.

A variation of the exemplary embodiment represented in FIGS. 3 and 4 is represented in FIG. 5. In this case, FIG. 5 shows, in a way similar to FIG. 4, a longitudinal half-section through an extruder 1 designed as a multi-screw extruder.

The difference in comparison with the exemplary embodiment represented in FIG. 4 is that an inert gas in a preferably condensed form is added to the polycondensate melt via an inert-gas inlet opening 44. Both the inert gas and the undesired low-molecular-weight constituents of the polycondensate to be reprocessed, in particular the still remaining water content, leave the extruder 1 via the degassing opening 43. It may be more favorable to feed the inert gas in via the opening 43 and let it out via the opening 44.

The invention is not restricted to the exemplary embodiments represented. In particular, the multi-screw extruder represented in FIGS. 3 to 5 can also be configured in such a way that, in the degassing zone 36, the polycondensate is located in the outer space 34 and the degassing openings 14 are connected to the inner space 33. For this purpose, the groove 39 is to be formed not on the inner barrel 31 but on the outer barrel 32.

Furthermore, the multi-screw extruder represented is not restricted to the twelve-screw shank [sic] represented only by way of example in FIG. 3.

The invention claimed is:

1. An Extruder for the reprocessing of a thermoplastic polycondensate, comprising:
   an inlet opening for introducing the polycondensate to be reprocessed in the solid state,
   an outlet opening for discharging the reprocessed polycondensate in the melted state,
   a plurality of closely intermeshing screw shanks, which are arranged in a barrel, extending from the inlet opening in the direction of an outlet opening and having at least a first conveying zone, for conveying the polycondensate in the solid state, a second conveying zone, for conveying the polycondensate in the melted state, and also kneading elements, arranged between the first conveying zone and the second conveying zone, for melting the polycondensate,
   at least one degassing opening, provided in the barrel in the region of the first conveying zone, and
   heating means for heating the barrel in the region of the first conveying zone,
   wherein the barrel is divided into an inner barrel and an outer barrel and the screw shanks are arranged in an annular form between the inner barrel and the outer barrel, the screw shanks separating an outer space, formed between the outer barrel and the screw shanks, from an inner space, formed between the inner barrel and the screw shanks, and wherein, in the region of the first conveying zone, the polycondensate is located either in the inner space and the degassing opening is connected to the outer space, or the polycondensate is located in the outer space and the degassing opening is connected to the inner space, and
   wherein, in the first conveying zone and in the region of the inlet opening therein, the pitch of each screw shank is reduced in the direction of the outlet opening.

2. The extruder according to claim 1, further comprising:
   pressure reducing means, connected to wherein the degassing opening is subjected to a negative pressure and/or an inert gas serving for flushing purposes is carried away via the degassing opening, for (1) subjecting the degassing opening to a negative pressure and/or (2) carrying away an inert gas.

3. The extruder according to claim 2,
   wherein the barrel has in the region of the first conveying zone at least one opening for the feeding in of the inert gas.

4. The extruder according to claim 1, wherein a conveying device is provided at the degassing opening.

5. The extruder according to claim 1, wherein the kneading elements have a total length L, the ratio L/D of the total length L of the kneading elements to the diameter D of the screw shanks lying between 1 and 2.

6. An extruder for the reprocessing of a thermoplastic polycondensate, comprising:
   an inlet opening for introducing the polycondensate to be reprocessed in the solid state,
   an outlet opening for discharging the reprocessed polycondensate in the melted state,
   a plurality of closely intermeshing screw shanks, which are arranged in a barrel, extending from the inlet opening in the direction of an outlet opening and having at least a first conveying zone, for conveying the polycondensate in the solid state, a second conveying zone, for conveying the polycondensate in the melted state, and also kneading elements, arranged between the first conveying zone and the second conveying zone, for melting the polycondensate, and
   at least one degassing opening, provided in the barrel in the region of the first conveying zone,
   wherein the barrel is divided into an inner barrel and an outer barrel and the screw shanks are arranged in an annular form between the inner barrel and the outer barrel, the screw shanks separating an outer space, formed between the outer barrel and the screw shanks, from an inner space, formed between the inner barrel and the screw shanks, and wherein, in the region of the first conveying zone, the polycondensate is substantially located either in the inner space and the degassing opening is connected to the outer space, or the polycondensate is substantially located in the outer space and the degassing opening is connected to the inner space, and
   wherein, in the first conveying zone and in the region of the inlet opening therein, the pitch of each screw shank is reduced in the direction of the outlet opening.

7. The extruder according to claim 6, wherein the barrel has in the region of the first conveying zone at least one opening for the feeding in of the inert gas, and
wherein the at least one opening for the feeding in of the inert gas is separate from and in addition to both the inlet opening and the at least one degassing opening.

* * * * *